US008028044B1

(12) United States Patent
Ramany et al.

(10) Patent No.: US 8,028,044 B1
(45) Date of Patent: Sep. 27, 2011

(54) FLEXIBLE STORAGE PLANNING (75) Inventors: Swaminathan Ramany, Sunnyvale, CA (US); Kesari Mishra, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1024 days.

(21) Appl. No.: 11/351,800

(22) Filed: Feb. 10, 2006

(51) Int. Cl.
*G06F 15/177* (2006.01)

(52) U.S. Cl. ......... 709/220; 709/226; 702/186; 719/315

(58) Field of Classification Search ............... 709/203, 709/220, 226; 702/186; 711/162
See application file for complete search history.

(56) References Cited

U.S. PATENT DOCUMENTS

| | | | |
|---|---|---|---|
| 5,129,088 A | 7/1992 | Auslander et al. | |
| 7,024,517 B1 | 4/2006 | Zahavi | |
| 7,096,338 B2 | 8/2006 | Takahashi et al. | |
| 7,117,294 B1 | 10/2006 | Mi et al. | |
| 7,219,192 B2 | 5/2007 | Yasukawa et al. | |
| 7,334,092 B1 | 2/2008 | Wang et al. | |
| 2002/0069369 A1 | 6/2002 | Tremain | |
| 2002/0091828 A1* | 7/2002 | Kitamura et al. | 709/226 |
| 2002/0099521 A1* | 7/2002 | Yang et al. | 702/186 |
| 2003/0037187 A1 | 2/2003 | Hinton et al. | |
| 2003/0046270 A1 | 3/2003 | Leung et al. | |
| 2004/0078397 A1 | 4/2004 | Mehta | |
| 2004/0133896 A1* | 7/2004 | Lym et al. | 719/315 |
| 2004/0172220 A1* | 9/2004 | Prekeges et al. | 702/186 |
| 2005/0033757 A1 | 2/2005 | Greenblatt et al. | |
| 2006/0026179 A1 | 2/2006 | Brown et al. | |
| 2006/0112154 A1 | 5/2006 | Douceur et al. | |
| 2006/0143418 A1 | 6/2006 | Takahashi et al. | |
| 2007/0098014 A1 | 5/2007 | Pomaranski et al. | |

* cited by examiner

*Primary Examiner* — Yves Dalencourt
(74) *Attorney, Agent, or Firm* — Cesari and McKenna, LLP (57) ABSTRACT

Methods, systems, and computer program products implementing a sizing infrastructure module that receives from a calling application program input requirements for a data storage system. A configuration for the data storage system is computed based on the input requirements, and the configuration is returned to the calling application program.

14 Claims, 4 Drawing Sheets

FLEXIBLE STORAGE PLANNING

BACKGROUND

The present invention relates to data storage systems.

A data storage system allows one or more client devices ("clients") to access (i.e., read and/or write) data on the data storage system through a host device ("host"), such as a file server, that is physically separate from the client. The clients typically communicate with the host over a network, such as a local area network, wide area network, virtual private network, or point-to-point connection. The host typically is connected to one or more storage devices directly or over a network, such as a storage area network (SAN). A storage device can be, for example, a disk, a tape, a solid-state memory storage device, or an array of disks or tapes. Some data storage systems include two or more hosts. Multiple hosts can be clustered such that two or more hosts are connected to each storage device for increased fault tolerance.

Software sizing tools are computer program applications that help a system architect or administrator decide how much data storage a given computer system requires based on such variables as the number of users the computer system has and how that storage should be structured (e.g., how many hosts and what type of reliability options should be used). Software capacity planning tools, which can be part of or separate from sizing tools, are computer program applications that allow the system architect to analyze the performance of various configurations of data storage equipment. A conventional software sizing or capacity planning tool typically must be replaced by a newer version of the tool when new hardware (e.g., a new type of disk array) becomes available. When multiple sizing or capacity planning tools are used in conjunction (e.g., a tool for sizing a storage system for a database application program and a tool for sizing the storage system for an e-mail application program), inconsistent results can occur, especially when the tools use different underlying models that calculate suggested configurations based on the inputs. Using multiple sizing or capacity planning tools also is cumbersome because each tool typically has a different input format for the system requirements and recommendations are output in different formats as well.

SUMMARY

Methods, systems, and computer program products are provided that allow application programs to be separated from storage hardware-specific and software-specific models and information in sizing and capacity-planning tools for data storage systems.

In one embodiment, a sizing infrastructure module receives from a calling application program a capacity requirement, a performance requirement, and a reliability requirement for a data storage system. A configuration for the data storage system is computed based on the capacity requirement, the performance requirement, and the reliability requirement, and the configuration is returned to the calling application program. A second set of requirements is received from a second application program, a second configuration for a second data storage system is computed based on the second set of requirements, and the second configuration is returned to the second calling application program.

Implementations can include one or more of the following features. The sizing infrastructure module and the calling application program each execute on a respective computer, where communication between the respective computers takes place over a network. The capacity requirement, the performance requirement, and the reliability requirement are received from the calling application program through an XML remote procedure call over an HTTP connection.

The performance requirement includes one or more workload definitions, where each workload definition describes a disk-access scenario. Each of the workload definitions has a respective associated required throughput that is included in the performance requirement, and computing the configuration includes computing a required number of disks using the required throughputs. A request is received from the calling application program for a list of valid host types and valid disk types that can be used in the data storage system. The valid host types and the valid disk types are retrieved from a database, and the list of the valid host types and the valid disk types is returned to the calling application program. Computing a configuration includes calling a retrieval routine to request a default value for a parameter that is not received from the calling application program, and the retrieval routine retrieves the default value from a database and returns the default value.

In another embodiment, a configuration estimation routine receives calls from a plurality of application programs. The configuration estimation routine receives from a calling application program a capacity requirement, a performance requirement, and a reliability requirement for a data storage system. The configuration estimation routine computes a configuration for the data storage system based on the capacity requirement, the performance requirement, and the reliability requirement, and returns the configuration to the calling application program.

Implementations can include one or more of the following features. The configuration estimation routine and the calling application program each execute on a respective computer, and communication between the respective computers takes place over network. The calling application program transmits the capacity requirement, the performance requirement, and the reliability requirement to the configuration estimation routine through an XML remote procedure call over an HTTP connection.

The system includes a database that stores valid host types and valid disk types that can be used in the data storage system. The system also includes a data access routine that receives calls from the plurality of application programs. The data-access routine receives from the calling application program a request for a list of the valid host types and the valid disk types, retrieves the valid host types and the valid disk types from the database, and returns the list to the calling application program. The configuration estimation routine calls a retrieval routine to request a default value for a parameter that is not received from the calling application program, and the retrieval routine retrieves the default value from a database and returns the default value to the configuration estimation routine.

The invention can be implemented to realize one or more of the following advantages. Sizing and capacity planning application programs access an up-to-date list of components that can be used in a data storage system and need not implement storage system sizing logic within the application program itself. Because the storage system sizing logic is centralized, the inputs required by the application programs and the results output by the application programs are consistent between tools. Centralized sizing logic also leads to a higher degree of correctness. When new hardware or new software versions become available, updates (e.g., to logic or data) that correspond to them only need to be made in one place, instead of in each individual application program. When new application programs are made, they use pre-existing standardized data access and configuration estimation routines, thereby shortening development time.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
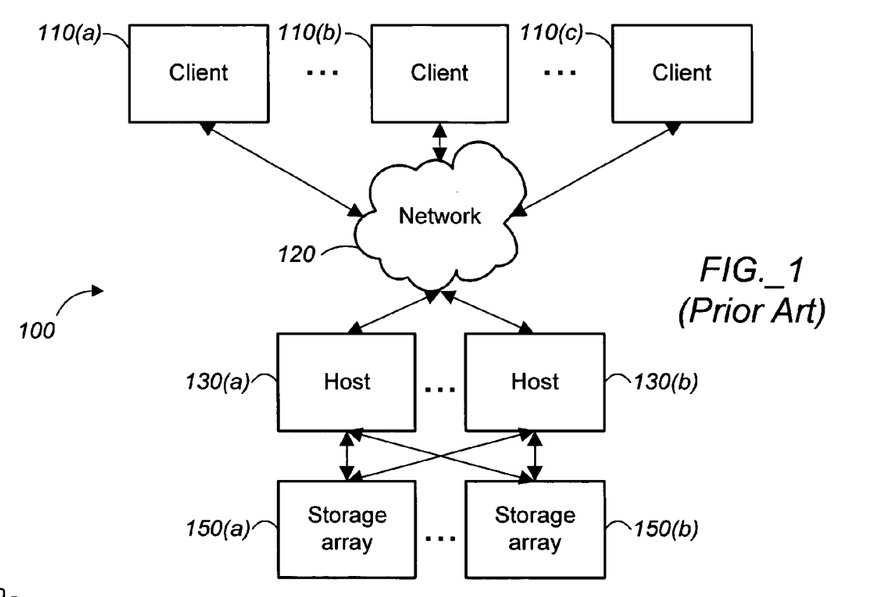
FIG. 1 is a block diagram of a computing environment.

As shown in FIG. 1, an illustrative environment 100 includes clients 110(a)-110(c) that are connected to hosts 130(a)-130(b) through a network 120. The clients 110(a)-110(c) communicate requests for services to the hosts 130(a)-130(b) over the network 120 and receive results back from the hosts 130(a)-130(b) over the network 120. The clients 110(a)-110(c) typically are computers such as general-purpose computers or application Servers. The number of clients can range from one to an arbitrarily large number. The hosts 130(a)-130(b) are capable of accessing data stored on storage devices 150(a)-150(b). Exemplary storage devices are available from Network Appliance of Sunnyvale, Calif. The hosts 130(a)-130(b) are connected to the storage devices 150(a)-150(b). Any suitable connection technology can be used, e.g., fibre-channel SAN, iSCSI SAN, or network attached storage (NAS) technology.

The number of hosts can range from one to an arbitrarily large number, and the number of storage arrays likewise can range from one to an arbitrarily large number. The hosts 130(a)-130(b) typically are file servers that can be clustered for increased fault-tolerance. The storage arrays 150(a)-150(b) typically are arrays of magnetic disks, such as fibre-channel SCSI disks, contained in one or more shelves. The combination of the hosts 130(a)-130(b) and the storage arrays 150(a)-150(b) forms a data storage system. The data storage system can use a Redundant Array of Independent (or Inexpensive) Disks (RAID) design, which helps protect against data loss in the event of a disk failure. In a RAID 4 system, for example, data is striped across multiple disks and is protected by parity information. If a disk in the array of disks fails, the parity information is used to recover the lost data from the failed disk.

A system architect or administrator has many choices to make when designing, expanding, or reconfiguring a data storage system such as that show in FIG. 1. Such an architect or administrator will generally use an application program such as a sizing tool or a capacity planning tool for this purpose.

A sizing infrastructure module implements host behavior models for use by sizing tools and capacity planning tools. A sizing or capacity planning application program sends the sizing infrastructure module requirement information (e.g., required throughput and capacity), and the sizing infrastructure module returns one or more configurations that satisfy the requirements, if such a configuration exists. The sizing infrastructure module is advantageously implemented separately from any single application program so it can receive calls from multiple application programs. The implementation of an application program that calls routines in the sizing infrastructure module can take any form, as long as the application program can make calls and receive results that are formatted according to the specifications of the sizing infrastructure module.

Figure 2:
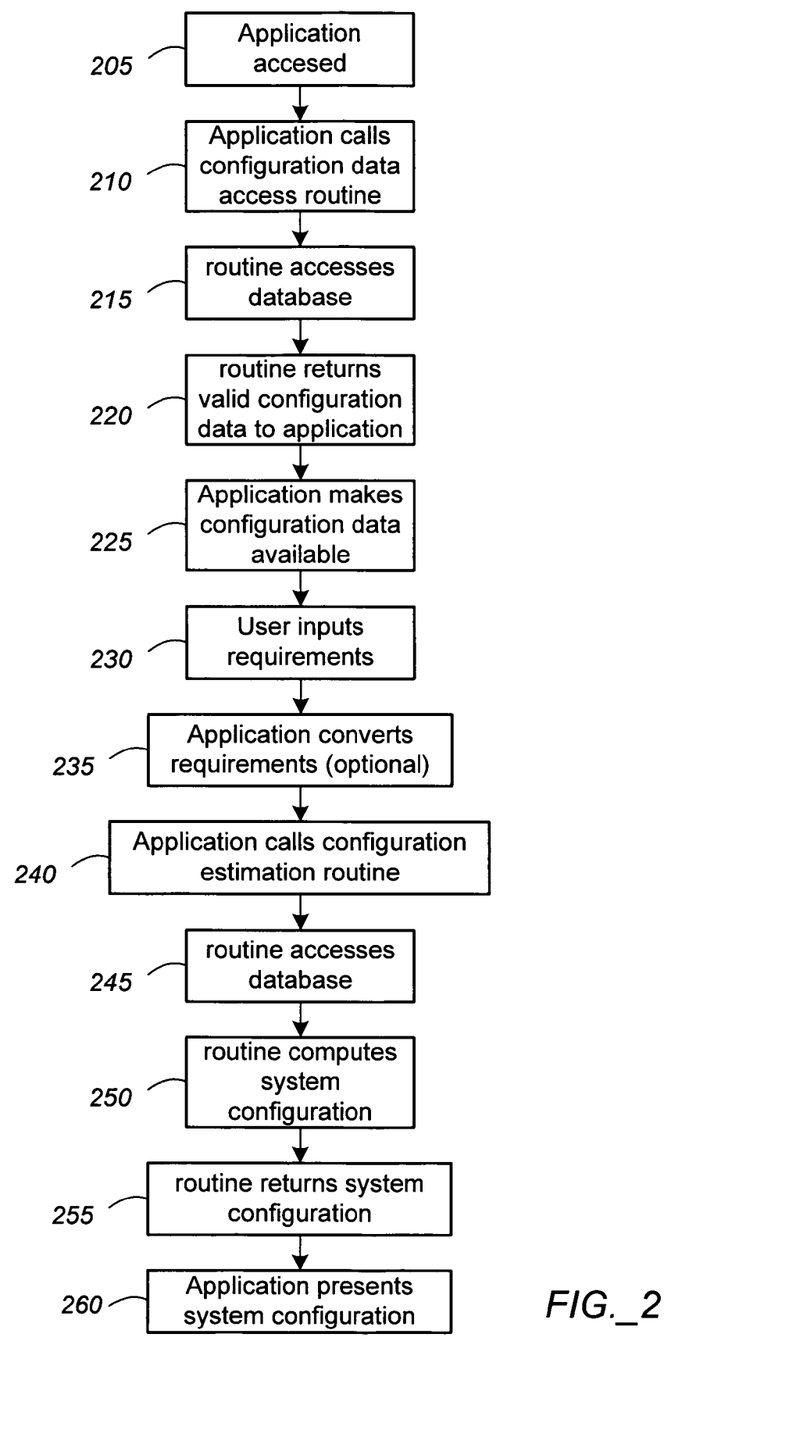
FIG. 2 is a flowchart of interactions between an application program, a sizing infrastructure module, and a database.

As shown in FIG. 2, when an application program such as a sizing tool or a capacity planning tool is accessed (step 205) (e.g., by a user opening the application program or clicking on a link to a web-based application), the application program calls one or more configuration data access routines (step 210) that are part of a sizing infrastructure module. The configuration data access routines access a database (step 215) to retrieve information about the hardware, software (e.g., operating system versions), protocols (e.g., NFS, iSCSI, and fibre-channel protocols), and options that currently can be used to generate a configuration for a data storage system. The information typically includes host types, disk types, reliability options (e.g., types of RAID that are supported), supported protocols and operating system versions, other storage-related software versions, and default values for variables such as RAID group size, CPU headroom, and capacity headroom. The database can be stored on the computer system where the configuration data access routines execute or can be stored on a remote computer system and accessed over a network connection. The database initially can be populated with data, and subsequently updated, manually (e.g., editing a database file by hand) or automatically (e.g., using a database upload function executed on a remote server). As the database is updated, up-to-date information becomes available to the configuration data access routines, making it unnecessary to individually update the internals of an application program that obtains configuration information using the configuration data access routines. The configuration data access routines return the current information to the application program (step 220), and the application program makes the information available to a user (step 225) (e.g., populates a user interface with the information).

The user inputs sizing or capacity-planning requirements to the application program (step 230), (e.g., capacity, performance, and reliability requirements). If necessary, the application program converts the user inputs into a format that logic routines in the sizing infrastructure module accept as input (step 235). For example, in a sizing application for an e-mail system, the user might input the requirements to the application program in terms of a number of e-mail users, the average mailbox size of each user, and the average (or maximum) number of e-mail messages per day. The application program converts these user-entered requirements into inputs suitable for the logic routines, such as required capacity and throughput.

The application program then calls one or more configuration estimation routines (step 240). The configuration estimation routine accesses additional information from the database (step 245) as needed (e.g., by calling a retrieval routine). The additional information from the database can include empirical data that is used by modeling logic in the configuration estimation routine and default values for input values that were not specified by the application program's call. The configuration estimation routine executes modeling logic on the inputs received from the application program and the database to compute one or more system configurations that satisfy the user's requirements (step 250), if such a configuration exists. If the configuration estimation routine cannot satisfy the user's requirements, it can generate an error or set the system configuration to "not possible." Each system configuration typically includes a host type and number of hosts, disk type and number of disks, number of networking cards, operating system version, and protocol. The system configuration can also include associated information, such as projected system utilization, reliability, and layout information (e.g., how the disks should be arranged).

The configuration estimation routine returns the one or more system configurations to the application program (step 255). The application program can present the system configurations directly to the user (step 260) or convert the system configurations to an application-specific format for presentation to the user. For example, a number of disks in a system configuration returned by the configuration estimation routine can be converted by the application program into a number of database disks and a number of log disks before being presented to the user.

Figure 3:
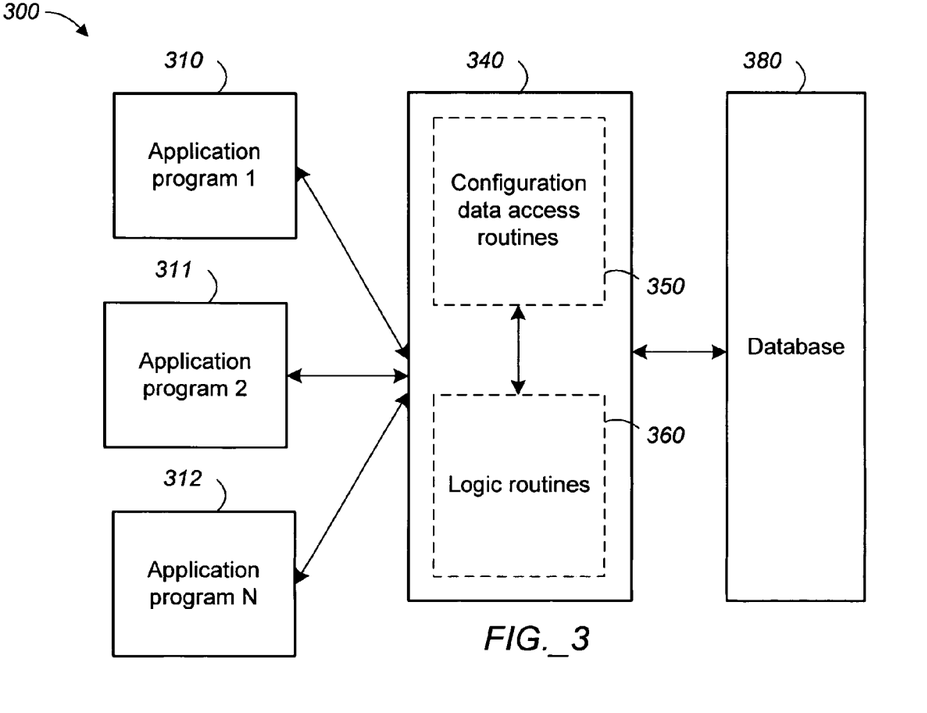
FIG. 3 is a block diagram of application programs, a sizing infrastructure module, and a database.

As shown in FIG. 3, a system 300 includes illustrative application programs 310, 311, and 312 (e.g., sizing or capacity planning application programs), each of which implements a user interface and application logic. A sizing infrastructure module 340 includes one or more configuration data access routines 350 and one or more logic routines 360 (e.g., a configuration estimation routine). The configuration data access routines 350 and the logic routines 360 retrieve data from a database 380. The database can be organized in any convenient fashion, including as a relational database, a hierarchical database, or one or more structured or unstructured text documents. An application program, such as application program 310, makes calls to the configuration data access routines 350 and to the logic routines 360. The sizing infrastructure module 340 can be located remotely, and the application program 310 can call the sizing infrastructure module 340 over a network connection.

In one implementation, the sizing infrastructure module 340 is an Extensible Markup Language (XML) Remote Procedure Call (RPC)-based implementation of an application programming interface (API). The application program 310 communicates with the routines in the sizing infrastructure module 340 by sending XML-RPC requests over HyperText Transfer Protocol (HTTP) connections. Results are received back as XML strings. Each XLM-RPC request contains a sequence of XML tags. In a Java implementation of the sizing infrastructure module 340, the request can be sent to a Java servlet that forwards the request to the appropriate routine. For example, each XML-RPC request can take the following form:

```
<?xml version="1.0"?>
<methodCall>
<methodName>SI.APIname</methodName>
<params>
    <param><value><value type>parameter value</value type></value>
    </param>
    ...
    <param><value><value type>parameter value</value type></value>
    </param>
</params>
</methodCall>
``` where parameter value can be a name and associated value (respectively enclosed, for example, with <name></name> and <value></value> XML tags) for a parameter of the request or can be a structure or data array including multiple names and values. Examples of possible parameter names include "usable_capacity," "cpu_headroom," and "drive_type."

The Java servlet packages the response from the API and sends it to the application program in the form of XML tags. For example, each response can take the following form:

```
<?xml version="1.0" encoding="ISO-8859-1" ?>
<methodResponse>
<params>
    <param>
        <value>
            <struct>
                <member>
                    <name>ReturnVariableName1</name>
                    <value>ReturnValue1</value>
                </member>
                ...
                <member>
                    <name>ReturnVariableNameN</name>
                    <value>ReturnValueN</value>
                </member>
            </struct>
        </value>
    </param>
</params>
</methodResponse>
``` where each ReturnVariableName is the name of a variable being returned to the application program, and each Return Value is a value associated with the variable. An example of a possible ReturnVariableName is "Number of Disks," and a possible associated Return Value is "19."

Because the sizing infrastructure module 340 is accessible using remote procedure calls over an HTTP connection, the sizing infrastructure module 340 can be called from a computer that is connected to the Internet. This allows sales people or field engineers at a customer site to have a sizing application that uses and presents the most up-to-date configuration information and logic routines. In this embodiment, the sizing infrastructure module 340 and the sizing application execute on two different computers.

In one implementation, one of the logic routines is a configuration estimation routine that computes possible configurations for a data storage system based on a set of requirements. The configuration estimation routine takes multiple input requirements, including capacity requirements, reliability requirements, general configuration requirements, and performance requirements. Examples of capacity requirements are usable capacity (e.g., gigabytes of storage), free space reserve or capacity reserve (e.g., expressed as a percentage of the usable capacity), space reserved for use by the operating system and storage software, and number of spare disks. Examples of reliability requirements are whether the hosts will be clustered, whether degraded failover performance is acceptable, RAID type (e.g., RAID-DP or RAID4), and RAID group size.

Examples of general configuration requirements are the desired host types (e.g., models of file servers), desired disk types (e.g., having a certain capacity, speed, and connection type), desired host operating system version, whether multiple-host configurations should be allowed, the maximum number of hosts and (if the hosts are clustered) host clusters, the minimum number of hosts and host clusters, a global volume type (e.g., either flexible volumes or traditional volumes which are tied to physical disks), and whether configurations where a shelf is partially full should be allowed.

Examples of performance requirements are CPU headroom on the hosts, overhead caused by multiple workloads, and a fragmentation factor that accounts for fragmentation of data already stored on the system. The performance requirements include a workload definition structure that includes one or more of a required throughput (e.g., in MB/s or input/output operations per second), a workload definition, a protocol, and a desired volume type for the workload. Each workload definition has four parts: sequential reads, sequential writes, random reads, and random writes. For each part, the workload definition specifies the percentage (from 0% to 100%) of the workload's accesses that the part accounts for and the size of operations (e.g., average size or worst-case size), latency constraints, and the total space actively accessed (working set size) for the respective part.

The configuration estimation routine outputs one or more suggested configurations. Each configuration typically includes the type of host, the number of hosts and host clusters that are needed, the number of disks needed for reads, the number of disks needed for writes, the total number of disks needed (which includes the number of parity disks needed to construct RAID groups), and the number of shelves needed. Each configuration typically also includes a ratio of disk operations to host operations for random reads, the system utilization for the sizing scenario, the capacity utilization with the number of disks suggested, the determining factor for the configuration (e.g., capacity, throughput, or latency), and a suggested layout for the hardware and software.

Figure 4A:
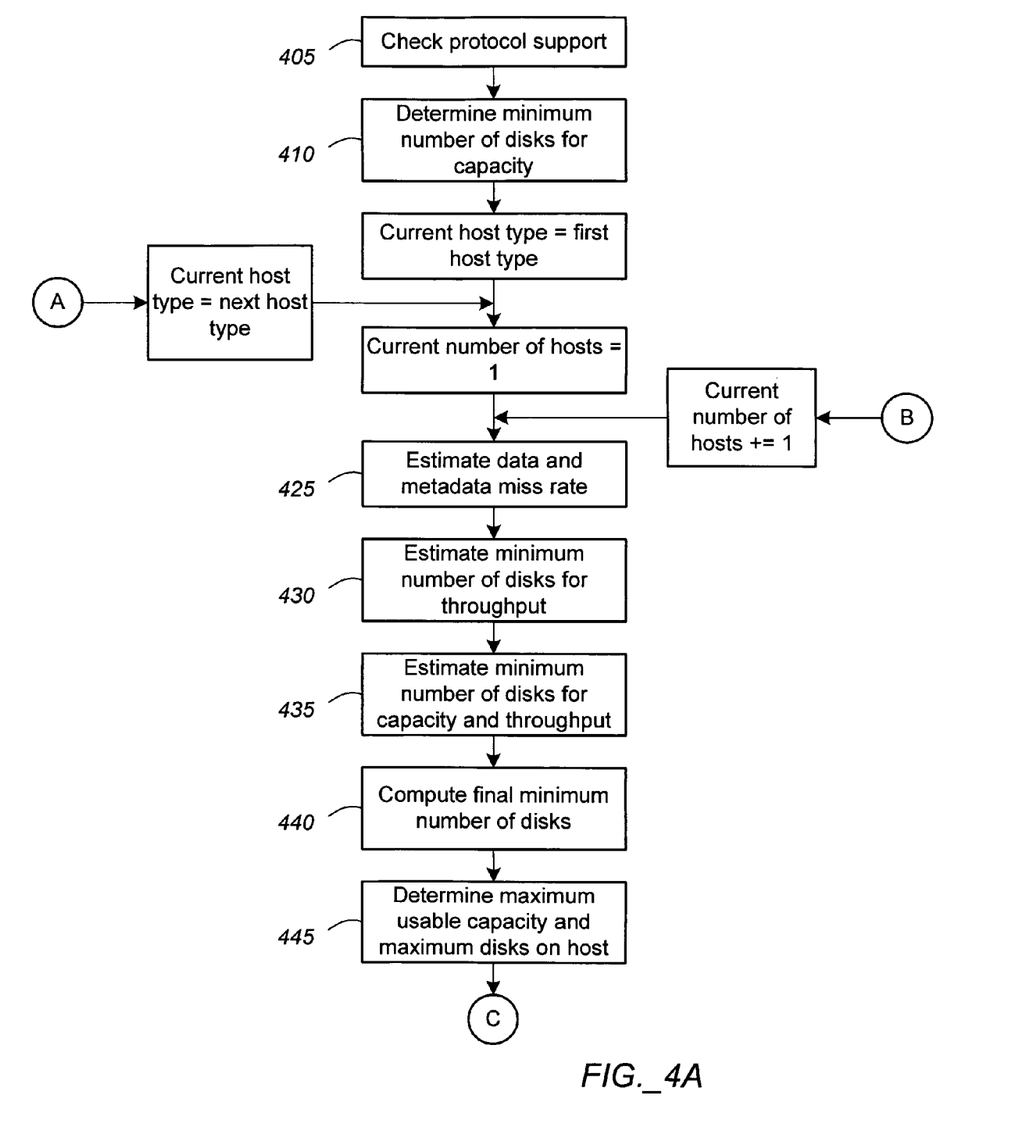
FIGS. 4A-4B are flowcharts of a configuration estimation routine.
Figure 4B:
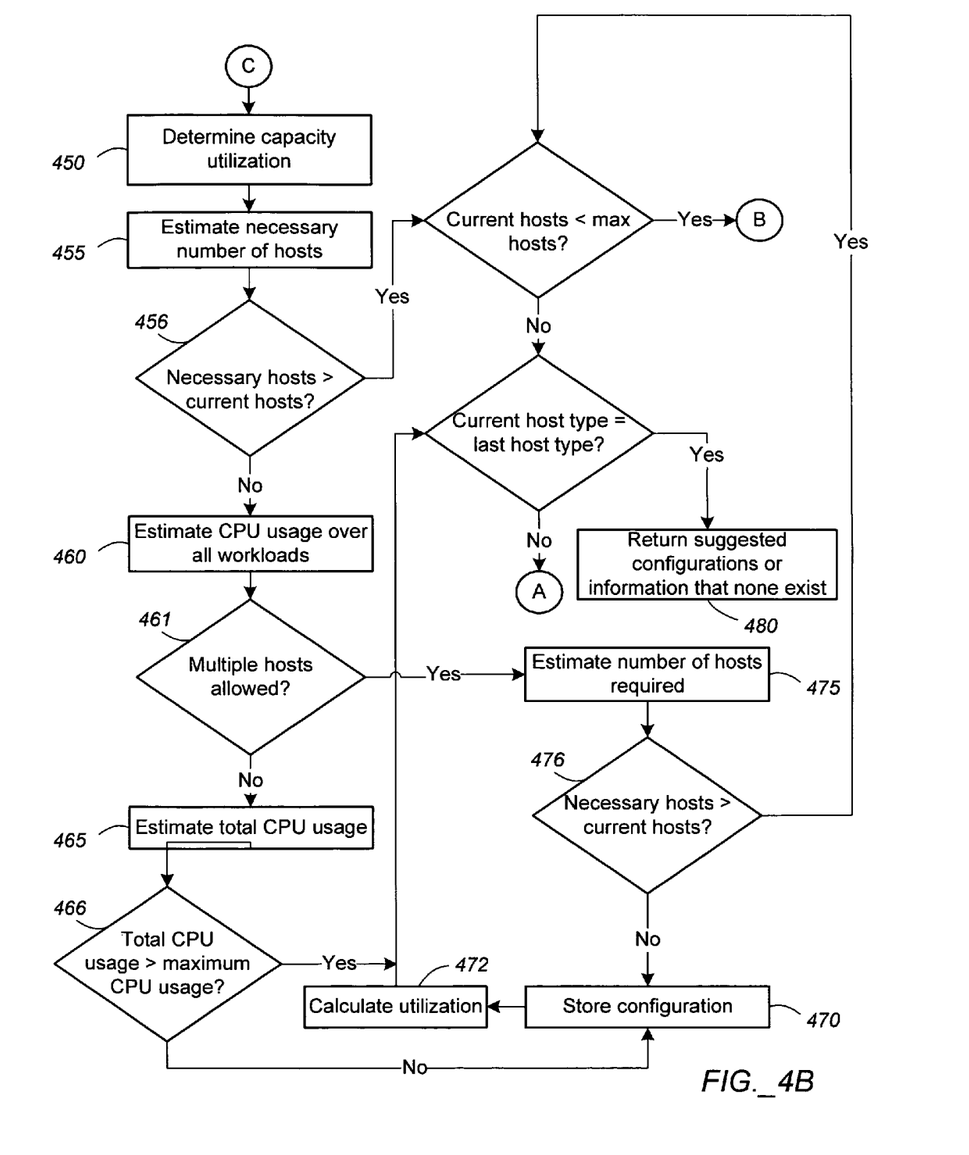

As shown in FIG. 4A and FIG. 4B, when the configuration estimation routine is called, the routine first verifies that the selected protocols are supported by the selected host and operating-system version combinations (step 405). The configuration estimation routine makes this determination by calling a routine in the configuration data access routines that returns the protocols that are supported by a given combination of a host type and an operating-system version. The routine in the configuration data access routines can be called locally or remotely. If none of the selected protocols are supported, an error message is returned.

The configuration estimation routine calls another routine in the configuration data access routines that converts the requested usable capacity into the actual capacity that is needed (e.g., including space for the operating system) and determines the minimum number of disks required to provide the actual capacity (step 410). The actual capacity can include space that is reserved for use by the operating system and storage software and capacity reserve for future growth.

The configuration estimation routine enters a double loop that performs a series of steps for every type of host and for each allowed number of hosts. The configuration estimation routine estimates a miss rate for both metadata and data blocks (step 425). A metadata block includes pointers to multiple data blocks. Data blocks are actual blocks of data that are stored in the data storage system. A data or metadata block miss occurs when a block needs to be read and it is not cached in memory.

For every workload and for every disk type, the configuration estimation routine estimates the minimum number of disks that are needed to achieve the requested throughput for the workload by calling a disk-estimation routine (step 430). The disk-estimation routine takes as inputs the host type, number of hosts, workload definition, protocol, throughput, operating system version, volume type, fragmentation factor, disk type, sum of all write throughputs, sum of all random read throughputs, and data and metadata miss rate. The disk-estimation routine produces as output a minimum number of data disks that are required to achieve the throughput. The minimum number of data disks is estimated, in part, using empirical data obtained from studies carried out in a lab concerning how throughput varies with the number of disks that are connected to a host. Disk latency also is calculated, based in part on expected network latency, client side latencies, and queuing delays observed in lab studies. This latency also is considered in finding the required number of disks.

The minimum number of disks needed to satisfy both the capacity and throughput requirements is determined (step 435) by taking the maximum of the number of disks required to satisfy the capacity requirement (calculated in step 410) and the number of disks required to satisfy the throughput requirement (calculated in step 435). The configuration estimation routine next calls a routine that returns a final minimum number of disks calculated by adding the minimum number of disks needed to satisfy both the capacity and throughput requirements to the required number of spare disks and the number of parity disks required for the requested RAID configuration (step 440). The routine also computes the number of shelves required by dividing the final minimum number of disks by the number of disks a shelf can contain, which is 14 in one shelf implementation, and, if the result is not an integer, rounding to the next higher integer. If each shelf is required to be full, the final minimum number of disks is increased to the next multiple of the number of disks a shelf can contain.

The configuration estimation routine calls another routine in the configuration data access routines to determine the maximum usable capacity and maximum number of disks that each host can handle given the current host and operating-system version (step 445). The configuration estimation routine calls another routine to determine the capacity utilization for each disk type (step 450).

The configuration estimation routine estimates the number of hosts required (step 455) by dividing the final minimum number of disks (calculated in step 440) by the maximum number of disks per host (calculated in step 445). If the result is not an integer number of hosts, it is rounded up to the nearest integer. If the number of hosts needed is greater than the current number of hosts being considered in the inner loop of the double loop, the inner loop is terminated ("yes" branch from decision step 456). If the number of hosts needed is less than or equal to the number of hosts being considered, processing of the current inner loop continues ("no" branch from decision step 456).

Next, the configuration estimation routine estimates the CPU usage over all of the workloads (step 460) by estimating the CPU usage for each workload as the sum of the CPU usages for each type of read or write in the workload. If multiple-host configurations are not allowed ("no" branch from decision step 461), the configuration estimation routine estimates the total CPU usage (step 465), which includes the CPU usage over all of the workloads plus the desired CPU headroom and the overhead for multiple workloads. The total CPU usage is compared to the host's maximum CPU usage, which typically depends on the protocol and operating system version. If the total CPU usage is no greater than the host's maximum CPU usage ("no" branch from decision step 466), the current configuration satisfies the requirements and the current configuration is stored as a suggested configuration (step 470). At this point, the configuration estimation routine is finished determining a configuration for the current host type, and because multiple-host configurations are not allowed ("no" branch from decision step 461), the configuration estimation routine proceeds directly to the next host type, if one exists.

If multiple-host configurations are allowed ("yes" branch from decision step 461), the configuration estimation routine estimates how many hosts are required in the current configuration (step 475). The required number of hosts is obtained by dividing the total CPU usage by a single host's maximum CPU usage and, if the result is not an integer, rounding up to the next integer. If the number of hosts required is greater than the current number of hosts being considered in the inner loop, the inner loop is terminated ("yes" branch from decision step 476). If the number of hosts needed is less than or equal to the number of hosts being considered ("no" branch from decision step 476), the current configuration satisfies the requirements and the current configuration is stored as a suggested configuration (step 470). At this point, the configuration estimation routine has found the minimum number of hosts required for the current host type. The system utilization for the current configuration is calculated (step 472), and the configuration estimation routine proceeds to the next host type, if one exists.

If no host type satisfies the requirements that were passed to the configuration estimation routine, the routine returns that information to the calling application program (step 480). The calling application program optionally prompts the user to change the requirements (e.g., to allow more hosts to be used) and calls the configuration estimation routine using the new requirements.

If any suggested configurations were found that satisfied the requirements, the suggested configurations are returned (step 480) to the calling application program along with information on how to configure the system (that is, layout information). For example, if a suggested configuration specifies 12 disks for reads and 8 disks for writes, layout information for an e-mail system might recommend configuring 20 disks into two volumes of 12 and 8 disks respectively with a RAID group of 2 parity and 10 data disks in the 12-disk volume and 2 parity disks and 6 data disks in the 8-disk volume. The calling application program presents the suggested configurations to the user. The suggested configurations can be sorted, for example, by the number of hosts required or by the estimated cost for the hardware in each suggested configuration.

In one implementation, the sizing infrastructure module is used to provide up-to-date answers to analysis questions involving sizing. For example, the database (e.g., database 380 in FIG. 3) can store data on host and disk performance that is collected from the field or from a laboratory environment. The sizing infrastructure module is called to determine whether a certain configuration would have an advantage over another configuration (e.g., a user can submit a query asking whether two RAID groups of 8 disks each would outperform one RAID group of 16 disks). The sizing infrastructure module accesses the most recent data from the database and performs the necessary logic to make the comparison. In this way, sizing questions are answered dynamically using the most current information.

Communications between an application program and the sizing infrastructure module have been described as using XML-RPC communication. In an alternative implementation, application programs submit sizing requests to the sizing infrastructure module as a dynamic form, and the servlet parses all of the required inputs from the form. In this implementation, XML-RPC communication is not used. The application program can reside on the same computer as the servlet, or the application program can communicate with the servlet over a network.

In another alternative implementation, the sizing infrastructure module is an executable that is used as a library from multiple application programs. In this implementation, the sizing infrastructure module can reside on the same computer as the application programs, as can the database that is accessed by the sizing infrastructure module. The database can be synchronized periodically to keep it up-to-date.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer.

The invention can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results, and different procedures can be used. Although the sizing infrastructure module is described as being a single unit, the sizing infrastructure module and its associated routines can be distributed across multiple files and need not all be loaded into memory as a unit.

What is claimed is:

1. A method implemented in a sizing infrastructure module, the method comprising:
   receiving, at the sizing infrastructure module executing on a first computer, from a first calling application program executing on a second computer of a plurality of computers in a computer network, a first capacity requirement, a first performance requirement, and a first reliability requirement for a first data storage system, the first computer configured as a centralized computer within the computer network so that the sizing infrastructure module is accessible by each calling application program of a plurality of calling application programs operating on the plurality of computers,
      wherein updates relating to each calling application program are updated within a database on the first computer, instead of on the plurality of computers;
      wherein the first performance requirement includes at least one workload definition, each workload definition describing a disk-access scenario; each workload definition having an associated required throughput that is included in the performance requirement,
   computing, by the sizing infrastructure module, a first configuration for the first data storage system based on the first capacity requirement, the first performance requirement, and the first reliability requirement,
      wherein computing the first configuration includes computing a required number of disks using the associated required throughput;
   returning the first configuration to the first calling application program;
   receiving, at the sizing infrastructure module executing on the first computer, from a second calling application program executing on a third computer of the plurality of computers a second capacity requirement, a second performance requirement, and a second reliability requirement for a second data storage system wherein the first, second and third computers are different computers;
   computing, by the sizing infrastructure module, a second configuration for the second data storage system based on the second capacity requirement, the second performance requirement, and the second reliability requirement; and
   returning the second configuration to the second calling application program.

2. The method of claim 1, wherein:
   the sizing infrastructure module and the first calling application program each execute on a respective computer, and wherein communication between the respective computers takes place over the network.

3. The method of claim 2, wherein:
   receiving from the first calling application program the first capacity requirement, the first performance requirement, and the first reliability requirement includes receiving the requirements through an XML remote procedure call over an HTTP connection.

4. The method of claim 1 further comprising:
   receiving from the first calling application program a request for a list of valid host types and valid disk types that can be used in the first data storage system;
   retrieving from the database the valid host types and the valid disk types; and
   returning the list of the valid host types and the valid disk types to the first calling application program.

5. A non-transitory machine readable medium containing executable program instructions executed by a processor, comprising:
   program instructions that receive, at a sizing infrastructure module executing on a first computer, from a first calling application program executing on a second computer of a plurality of computers in a computer network, a first capacity requirement, a first performance requirement, and a first reliability requirement for a first data storage system, the first computer configured as a centralized computer within the computer network so that the sizing infrastructure module is accessible by each calling application program of the plurality of application programs operating on the plurality of computers,
      wherein updates relating to each calling application program are updated within a database on the first computer, instead of on the plurality of computers;
      wherein the first performance requirement includes at least one workload definition, each workload definition describing a disk-access scenario; each workload definition has an associated required throughput that is included in the performance requirement;
   program instructions that compute, by the sizing infrastructure module, a first configuration for the first data storage system based on the first capacity requirement, the first performance requirement, and the first reliability requirement,
   wherein computing the first configuration includes program instructions that compute a required number of disks using the associated required throughput;
   program instructions that return the first configuration to the first calling application program;
   program instructions that receive, at the sizing infrastructure module, from a second calling application program executing on a third computer of the plurality of computer, a second capacity requirement, a second performance requirement, and a second reliability requirement for a second data storage system wherein the first, second and third computers are different computers;

program instructions that compute, by the sizing infrastructure module, a second configuration for the second data storage system based on the second capacity requirement, the second performance requirement, and the second reliability requirement; and program instructions that return the second configuration to the second calling application program.

6. The machine readable medium of claim 5, wherein:

the sizing infrastructure module and the first calling application program each execute on a respective computer, and wherein communication between the respective computers takes place over the network.

7. The machine readable medium of claim 6, wherein:

program instructions that receive from the first calling application program the first capacity requirement, the first performance requirement, and the first reliability requirement includes program instructions that receive the requirements through an XML remote procedure call over an HTTP connection.

8. The machine readable medium of claim 5, further comprising:

program instructions that receive from the first calling application program a request for a list of valid host types and valid disk types that can be used in the first data storage system;

program instructions that retrieve from the database the valid host types and the valid disk types; and program instructions that return the list of the valid host types and the valid disk types to the first calling application program.

9. A system comprising:

a configuration estimation routine configured to receive, on a sizing infrastructure module executing on a first computer, calls from a plurality of application programs operating on a plurality of computers in a computer network different from the first computer, the first computer configured as a centralized computer within the computer network so that the sizing infrastructure module is accessible by each calling application program operating on the plurality of computers, wherein updates relating to each calling application program are updated within a database on the centralized computer, instead of on the plurality of computers, wherein the performance requirement includes at least one workload definition, each workload definition describing a disk-access scenario; each workload definition having an associated required throughput that is included in the performance requirement, the configuration estimation routine receiving from the plurality of calling application programs, a capacity requirement, a performance requirement, and a reliability requirement for a data storage system, wherein computing the configuration includes computing a required number of disks using the associated required throughput, computing, by the sizing infrastructure module, a configuration for the data storage system based on the capacity requirement, the performance requirement, and the reliability requirement, wherein computing the configuration includes computing a required number of disks using the associated required throughput, and returning the configuration to the calling application program.

10. The system of claim 9, wherein:

the configuration estimation routine and each calling application program execute on a respective computer, and wherein communication between the respective computers takes place over the network.

11. The system of claim 10, wherein:

the calling application program transmits the capacity requirement, the performance requirement, and the reliability requirement to the configuration estimation routine through an XML remote procedure call over an HTTP connection.

12. The system of claim 9, further comprising:

the database configured to store valid host types and valid disk types that can be used in the data storage system; and a data access routine configured to receive calls from the plurality of application programs, the data-access routine receiving from at least one of the calling application programs a request for a list of the valid host types and the valid disk types, retrieving the valid host types and the valid disk types from the database, and returning the list to the calling application program.

13. A method implemented in a sizing infrastructure module executing on a first computer, the method comprising:

receiving, at the sizing infrastructure module, from a first calling application program executing on a second computer of a plurality of computers in a computer network, a first input requirement for a first data storage system, the sizing infrastructure module executing on a centralized computer within the computer network so that the sizing infrastructure module is accessible by each of a plurality of calling application programs operating on the plurality of computers, wherein updates relating to each calling application program are updated within a database on the first computer, instead of on the plurality of computers;

wherein the first performance requirement includes at least one workload definition, each workload definition describing a disk-access scenario; each workload definition having an associated required throughput that is included in the performance requirement, computing a first configuration for the first data storage system based on the first input requirement by the sizing infrastructure module, wherein computing the first configuration includes computing a required number of disks using the associated required throughput;

returning the first configuration to the first calling application program;

receiving, at the sizing infrastructure module, from a second calling application program executing on a third computer of the plurality of computers a second input requirement for a second data storage system wherein the first, second and third computers are different computers;

computing a second configuration for the second data storage system based on the second input requirement by sizing infrastructure module; and returning the second configuration to the second calling application program.

14. The method of claim 13, wherein:

the sizing infrastructure module and the first calling application program each execute on a respective computer, and wherein communication between the respective computers takes place over the network.

* * * * *

UNITED STATES PATENT AND TRADEMARK OFFICE
CERTIFICATE OF CORRECTION

| | | |
|---|---|---|
| PATENT NO. | : 8,028,044 B1 | Page 1 of 1 |
| APPLICATION NO. | : 11/351800 | |
| DATED | : September 27, 2011 | |
| INVENTOR(S) | : Ramany et al. | |

It is certified that error appears in the above-identified patent and that said Letters Patent is hereby corrected as shown below:

In Col. 12, lines 63-64 should read:
   executing on a third computer of the plurality of ~~com-puter~~ computers, a second capacity requirement, a second performance In Col. 13, lines 56-57: delete
   "~~wherein computing the configuration includes computing a required number of disks using the associated required throughput,~~"

Signed and Sealed this
Eighth Day of January, 2013

David J. Kappos
*Director of the United States Patent and Trademark Office*